US012776155B2

(12) United States Patent
Fan et al.

(10) Patent No.: US 12,776,155 B2
(45) Date of Patent: Oct. 27, 2026

(54) ANNOTATION INFORMATION INTERACTION METHOD, FIRST TERMINAL DEVICE, SERVER AND SECOND TERMINAL DEVICE

(71) Applicant: Beijing Zitiao Network Technology Co., Ltd., Beijing (CN)

(72) Inventors: Xiangyu Fan, Beijing (CN); Shiyang Zhang, Beijing (CN); Qirun Kang, Beijing (CN); Chenxiang Zhao, Beijing (CN); Yongting Zhang, Beijing (CN); Yushan Zhang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 197 days.

(21) Appl. No.: 18/445,083

(22) PCT Filed: Jul. 29, 2021

(86) PCT No.: PCT/CN2021/109374

§ 371 (c)(1),
(2) Date: Mar. 29, 2023

(87) PCT Pub. No.: WO2022/068364

PCT Pub. Date: Apr. 7, 2022

(65) Prior Publication Data

US 2024/0233224 A1 Jul. 11, 2024

(30) Foreign Application Priority Data

Sep. 29, 2020 (CN) ........................ 202011046209.3

(51) Int. Cl.
*G06T 11/60* (2026.01)
*G06V 20/70* (2022.01)

(52) U.S. Cl.
CPC .............. *G06T 11/60* (2013.01); *G06V 20/70* (2022.01); *G06T 2200/24* (2013.01)

(58) Field of Classification Search
CPC ..... G06T 11/60; G06T 2200/24; G06T 20/70; G06T 20/20; H04N 7/142; H04N 21/4756;

(Continued)

(56) References Cited

U.S. PATENT DOCUMENTS 10,499,002 B2 * 12/2019 Igarashi .................. G06T 19/00
11,430,211 B1 * 8/2022 Tiutiunnik .............. H04L 51/10

(Continued)

FOREIGN PATENT DOCUMENTS

CN 103105993 A 5/2013
CN 105323252 A 2/2016

(Continued)

OTHER PUBLICATIONS

China National Intellectual Property Administration, International Search Report and Written Opinion Issued in Application No. PCT/CN2021/109374, Oct. 22, 2021, WIPO, 12 pages.

(Continued)

*Primary Examiner* — Jin Cheng Wang
(74) *Attorney, Agent, or Firm* — Alleman Hall LLP

(57) ABSTRACT

Embodiments of the present disclosure provides an information interaction method, and a first terminal device, a server, a second terminal device, an electronic device, a computer readable storage medium and a computer program product. Where the method includes: acquiring a first captured image for a real object and displaying the first captured image; in response to a user input operation for the real object in the first captured image, generating, based on input information from the user input operation, annotation information of the real object; and sending the annotation infor- (Continued)

mation of the real object to a server; where the annotation information, in case that a second terminal device acquires a second captured image for the real object, is sent by the server to the second terminal device and is displayed, corresponding to the real object, by the second terminal device on the second captured image.

19 Claims, 7 Drawing Sheets

(58) Field of Classification Search
CPC .... H04N 21/4788; H04N 23/62; G06V 20/70; G06V 20/20
See application file for complete search history.

(56) References Cited

U.S. PATENT DOCUMENTS

| | | | | |
|---|---|---|---|---|
| 2012/0092507 | A1 | 4/2012 | Jung et al. | |
| 2012/0263154 | A1* | 10/2012 | Blanchflower | G06T 11/60 455/414.1 |
| 2015/0015459 | A1* | 1/2015 | Cho | H04M 1/724 345/8 |
| 2016/0055675 | A1* | 2/2016 | Kasahara | G06F 3/147 345/633 |
| 2017/0243403 | A1* | 8/2017 | Daniels | G06F 3/1454 |
| 2017/0280188 | A1* | 9/2017 | Mullins | H04N 21/4302 |
| 2019/0304196 | A1* | 10/2019 | Driancourt | G06F 3/011 |
| 2019/0318076 | A1* | 10/2019 | Chun | H04L 67/131 |
| 2019/0318404 | A1* | 10/2019 | LaMontagne | G06T 19/006 |
| 2019/0370544 | A1* | 12/2019 | Wright, Jr. | G06T 7/20 |
| 2020/0134670 | A1* | 4/2020 | Du | G06V 20/40 |
| 2021/0005014 | A1* | 1/2021 | Hayashi | G06T 19/20 |

FOREIGN PATENT DOCUMENTS

| | | | |
|---|---|---|---|
| CN | 105468142 | A | 4/2016 |
| CN | 107247510 | A | 10/2017 |
| CN | 109005285 | A | 12/2018 |
| CN | 112218027 | A | 1/2021 |

OTHER PUBLICATIONS

China National Intellectual Property Administration, Office Action and Search Report Issued in Application No. 202011046209.3, Dec. 2, 2021, 20 pages.
China National Intellectual Property Administration, Office Action and Search Report Issued in Application No. 202011046209.3, Jul. 5, 2022, 21 pages.
China National Intellectual Property Administration, Notice of Rejection Issued in Application No. 202011046209.3, Dec. 5, 2022, 7 pages.

* cited by examiner

ANNOTATION INFORMATION INTERACTION METHOD, FIRST TERMINAL DEVICE, SERVER AND SECOND TERMINAL DEVICE

CROSS-REFERENCE TO RELATED APPLICATIONS

This application is a national stage of International Application No. PCT/CN2021/109374, filed on Jul. 29, 2021, which claims priority to Chinese Patent Application No. 202011046209.3, filed to the China National Intellectual Property Administration on Sep. 29, 2020, and entitled "Information Interaction Method, First Terminal Device, Server and Second Terminal Device". The disclosures of the aforementioned applications are hereby incorporated by reference in their entireties.

TECHNICAL FIELD

Embodiments of the present disclosure relate to the field of communication technology, and in particular, to an information interaction method, a first terminal device, a server, a second terminal device, an electronic device, a computer readable storage medium and a computer program product.

BACKGROUND

With the progress of science and technology, users can achieve information interaction, i.e., conduct social behavior, through various software and applications (App for short).

However, current social software provides a relatively simple social way and cannot adapt to the rich and changeable social needs of users.

SUMMARY

Embodiments of the present disclosure provide an information interaction method, and a first terminal device, a server, a second terminal device, an electronic device, a computer readable storage medium and a computer program product, so as to overcome the technical problem of a relatively simple social way in the prior art.

In a first aspect, an embodiment of the present disclosure provides an information interaction method, which is applied to a first terminal device. The method includes: acquiring a first captured image for a real object and displaying the first captured image; in response to a user input operation for the real object in the first captured image, generating, based on input information from the user input operation, annotation information of the real object; and sending the annotation information of the real object to a server; where the annotation information, in case that a second terminal device acquires a second captured image for the real object, is sent by the server to the second terminal device and is displayed, corresponding to the real object, by the second terminal device on the second captured image.

In a second aspect, an embodiment of the present disclosure provides an information interaction method, which is applied to a server, and the method includes: receiving annotation information of a real object sent by a first terminal device; where the annotation information, in response to a user input operation for the real object in a first captured image, is generated by the first terminal device based on input information from the user input operation, and the first captured image is acquired through the first terminal device and for the real object; receiving an acquisition request sent by a second terminal device, where the acquisition request is used for indicating a case that the second terminal device acquires a second captured image for the real object; and sending the annotation information to the second terminal device, in response to the acquisition request.

In a third aspect, an embodiment of the present disclosure provides an information interaction method, which is applied to a second terminal device, and the method includes: acquiring a second captured image for a real object, and sending an acquisition request to a server; where the server stores annotation information of the real object sent by a first terminal device, the annotation information is generated by the first terminal device, based on input information from a user input operation, in response to the user input operation for the real object in a first captured image, and the first captured image is acquired through the first terminal device and for the real object; receiving the annotation information of the real object returned by the server; and displaying the annotation information, corresponding to the real object, on the second captured image.

In a fourth aspect, an embodiment of the present disclosure provides a first terminal device, including: a first acquisition module, configured to acquire a first captured image for a real object and display the first captured image; an information generation module, configured to generate, based on input information from a user input operation, annotation information of the real object, in response to the user input operation for the real object in the first captured image; and a first sending module, configured to send the annotation information of the real object to a server; where the annotation information, in case that a second terminal device acquires a second captured image for the real object, is sent by the server to the second terminal device, and is displayed, corresponding to the real object, by the second terminal device on the second captured image.

In a fifth aspect, an embodiment of the present disclosure provides a server, including: a first receiving module, configured to receive annotation information of a real object sent by a first terminal device; where the annotation information, in response to a user input operation for the real object in a first captured image, is generated by the first terminal device based on input information from the user input operation, and the first captured image is acquired through the first terminal device and for the real object; and a second receiving module, configured to receive an acquisition request sent by a second terminal device, where the acquisition request is used for indicating a case that the second terminal device acquires a second captured image for the real object; and a second sending module, configured to send the annotation information to the second terminal device, in response to the acquisition request.

In a sixth aspect, an embodiment of the present disclosure provides a second terminal device, including: a second acquisition module, configured to acquire a second captured image for a real object, and send an acquisition request to a server; where the server stores annotation information of the real object sent by a first terminal device, the annotation information is generated by the first terminal device, based on input information from a user input operation, in response to the user input operation for the real object in a first captured image, and the first captured image is acquired through the first terminal device and for the real object; a third receiving module, configured to receive the annotation information of the real object returned by the server; and an information display module, configured to display the annotation information, corresponding to the real object, on the second captured image.

In a seventh aspect, an embodiment of the present disclosure provides an electronic device, including: at least one processor and a memory; where the memory stores computer executable instructions; when the at least one processor executes the computer executable instructions stored in the memory, the at least one processor is enabled to execute the methods according to various possible designs of the first aspect and the first aspect, or to execute the methods according to various possible designs of the second aspect and the second aspect, or to execute the methods according to various possible designs of the third aspect and the third aspect.

In an eighth aspect, an embodiment of the present disclosure provides a computer-readable storage medium, where the computer-readable storage medium stores computer-executable instructions, when the computer-executable instructions are executed by a processor, the methods according to various possible designs of the first aspect and the first aspect are implemented, or the methods according to various possible designs of the second aspect and the second aspect are implemented, or the methods according to various possible designs of the third aspect and the third aspect are implemented.

In a ninth aspect, an embodiment of the present disclosure provides a computer program product including a computer program which, when executed by a processor, implements the methods according to various possible designs of the first aspect and the first aspect, or the methods according to various possible designs of the second aspect and the second aspect, or the methods according to various possible designs of the third aspect and the third aspect.

In a tenth aspect, an embodiment of the present disclosure further provides a computer program which, when executed by a processor, implements the methods according to various possible designs of the first aspect and the first aspect, or the methods according to various possible designs of the second aspect and the second aspect, or the methods according to various possible designs of the third aspect and the third aspect.

The embodiments of the present disclosure provide an information interaction method, and a first terminal device, a server, a second terminal device, an electronic device, a computer readable storage medium and a computer program product, which allow the following: acquiring a first captured image for a real object and displaying the first captured image; in response to a user input operation for the real object in the first captured image, generating, based on input information from the user input operation, annotation information of the real object; and sending the annotation information of the real object to a server; where the annotation information, in case that a second terminal device acquires a second captured image for the real object, is sent by the server to the second terminal device and is displayed, corresponding to the real object, by the second terminal device on the second captured image. That is, in the embodiment of the present disclosure, a user may realize information interaction with other users who come here later by virtual creation of the real object, which enriches the social way.

BRIEF DESCRIPTION OF THE DRAWINGS

In order to more clearly illustrate the embodiments of the present disclosure or the technical solution in the prior art, the following will briefly introduce the drawings required in the description of the embodiments or the prior art. Apparently, the drawings described below are some embodiments of the present disclosure, for those of ordinary skill in the art, without creative effort, other drawings may also be obtained according to these drawings.

DESCRIPTION OF EMBODIMENTS

In order to make the purpose, technical solution and advantages of embodiments of the present disclosure clearer, the technical solution in the embodiment of the present disclosure will be clearly and completely described below with reference to the drawings. Apparently, the described embodiments are some of the embodiments of the present disclosure, but not all of them. Based on the embodiments of the present disclosure, all other embodiments obtained by those of ordinary skill in the art without creative effort belong to the scope of protection of the present disclosure.

Augmented reality (AR for short): it is a technology that that skillfully blends virtual information with the real world. It may simulate virtual information such as words, images, three-dimensional models, music, and videos and apply them to the real world. The two kinds of information complement each other, thereby achieving "enhancement" of the real world.

Figure 1:
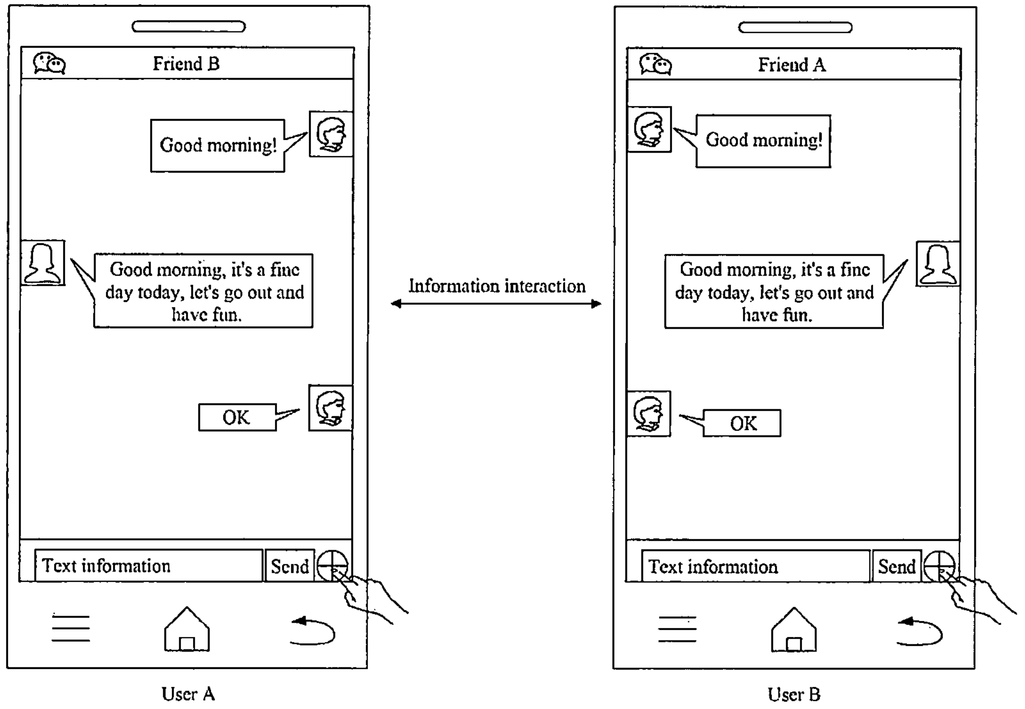
FIG. 1 is an exemplary diagram of an information interaction in the prior art.

With the development of science and technology, users in different spatial locations may achieve information interaction through various software and applications (such as WeChat, QQ and other communication apps), that is, social behavior. FIG. 1 is an exemplary diagram of an information interaction in the prior art. As shown in FIG. 1, both parties (such as a user A and a user B) who need to socialize need to install the same application (such as the WeChat App) and register their own user accounts, and then they may perform information interaction with each other through the software or the application after adding the other as friend.

It is evident that the existing way of information interaction have limitations, that is, only acquaintances in different places may interact with each other at the same time, while strangers in the same place can't interact at different times. For example, guests attending a gym want to determine who else is coming to the gym, or candidates want to look for someone in a library who is also preparing for an exam, etc. That is to say, the current social software provides a simple social way, which can't adapt to users' diverse social needs.

In view of the above problem, the technical concept of the present disclosure is that users leave their own virtual imprints on a real object, when others photograph that real object, they may view the virtual imprints left by the users on that real object, allowing for subsequent social behavior.

Figure 2:
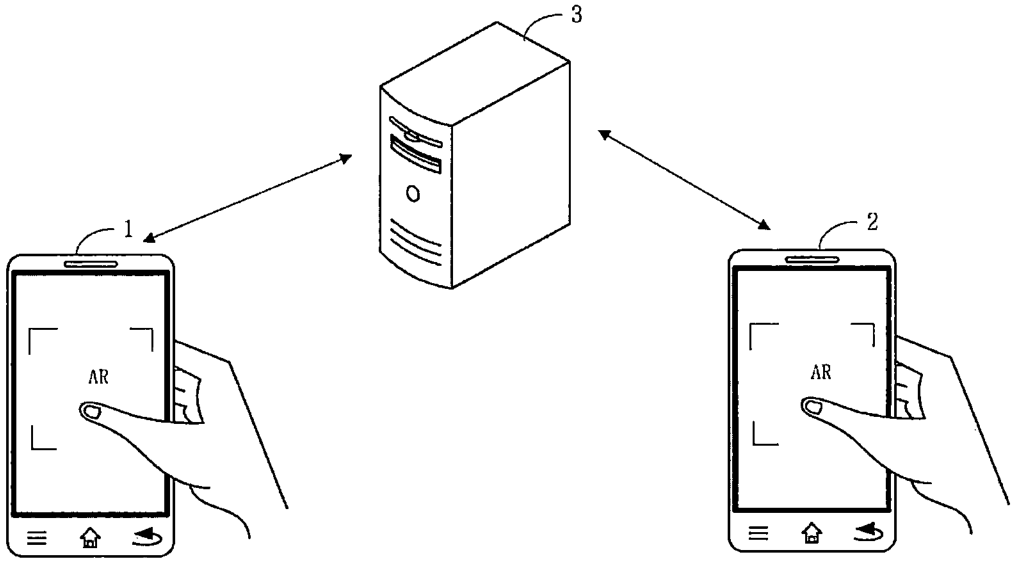
FIG. 2 is a schematic diagram of a system architecture provided by an embodiment of the present disclosure.

FIG. 2 is a schematic diagram of a system architecture provided by an embodiment of the present disclosure. As shown in FIG. 2, one of the system architectures provided by this embodiment includes a first terminal device 1, a second terminal device 2 and a server 3 (the server may be a cloud server); where the first terminal device 1, the second terminal device 2 and the server 3 cooperate to complete the information interaction methods of the following embodiments, and realize the information interaction between a first user holding the first terminal device 1 and a second user holding the second terminal device 2.

Figure 3:
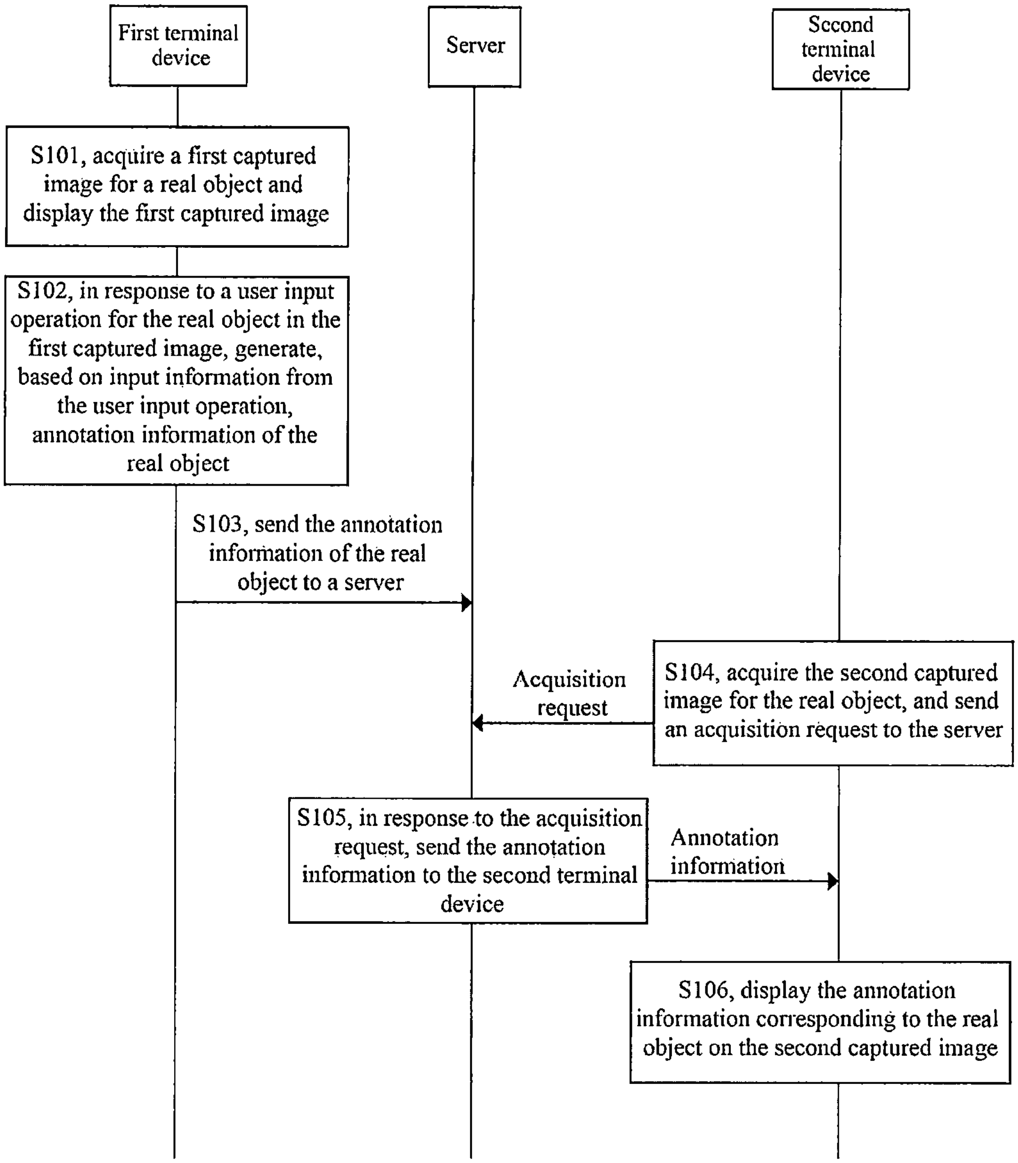
FIG. 3 is flow chart I of an information interaction method provided by an embodiment of the present disclosure.

Referring to FIG. 3, FIG. 3 is flow chart I of an information interaction method provided by an embodiment of the present disclosure. The information interaction method includes:

S101, acquire a first captured image for a real object and displaying the first captured image.

Specifically, an execution body of this step is the first terminal device. When a first user holding the first terminal device arrives at a place, he is interested in the place and wants to leave his own imprint there, the first user may open the application installed on the first terminal device, in an implementation, the application is the AR software, a real object (such as a wall, a sculpture and a table) in the current environment is shot, the captured image corresponding to the real object is obtained and displayed to the first user.

In an implementation, the first captured image is a three-dimensional stereoscopic image of a real object. Specifically, the three-dimensional stereoscopic image of the real object may be acquired based on the feature point cloud technology, that is, a plurality of feature points of the three-dimensional stereoscopic image are extracted by using the feature point cloud technology, next the three-dimensional stereoscopic image of the real object is acquired according to the feature points, and then the three-dimensional stereoscopic image is displayed on the first terminal device.

S102, in response to a user input operation for the real object in the first captured image, generate, based on input information from the user input operation, annotation information of the real object.

Specifically, the execution body of this step is the first terminal device. After the first captured image is displayed on the first terminal device, the first user may perform information entering operation on the real object in the first captured image, to generate the annotation information of the real object.

In an embodiment of the present disclosure, the annotation information includes at least one of the following: comment information, graffiti, adding a picture, games and programs. Specifically, users may comment, click Like button, add a picture, graffiti, paste audio and video, paste mini games or mini programs on the real object in the first captured image through the AR software.

In an embodiment of the present disclosure, the step S102 includes: acquiring a two-dimensional plane of the of the real object in the first captured image; and in response to the user input operation for the two-dimensional plane, generating, based on the input information from the user input operation, the annotation information of the real object.

Specifically, the two-dimensional plane of the real object in the first captured image may be acquired based on the plane detection technology, and then text comment, graffiti, adding a picture and other processes may be performed on the two-dimensional plane. Where the plane detection technology includes the horizontal plane detection technology and the vertical plane detection technology. Furthermore, after acquiring the three-dimensional image of the real object in step the S101, the horizontal plane of the real object may be extracted from the three-dimensional image of the real object based on the horizontal plane detection technology, or the vertical plane of the real object may be extracted from the three-dimensional image of the real object based on the vertical plane detection technology; and then information is entered into the extracted horizontal plane or the vertical plane, to generate the annotation information.

It should be noted that the two-dimensional plane of the real object is extracted by using the above plane detection technology, and then adding a picture, graffiti, and other processes may be performed on the two-dimensional plane, so that the added picture, the graffiti and the like may fit perfectly with the real object, thereby improving the display effect of virtual creation.

S103, send the annotation information of the real object to the server.

The annotation information, in case that a second terminal device acquires a second captured image for the real object, is sent by the server to the second terminal device and is displayed, corresponding to the real object, by the second terminal device on the second captured image.

Specifically, the execution body of this step is the first terminal device. The first terminal device may send the annotation information to the server for storage.

Correspondingly, on the server side, the server receives the annotation information of the real object sent by the first terminal device; where the annotation information, in response to a user input operation for the real object in a first captured image, is generated by the first terminal device based on input information from the user input operation, and the first captured image is acquired through the first terminal device and for the real object. That is to say, the annotation information created by different users or one user on the same real object or different real objects may be stored on the server side.

S104, acquire the second captured image for the real object, and send an acquisition request to the server.

Specifically, the execution body of this step is the second terminal device. When the second user holding the second terminal device arrives at a place, and wants to know whether someone has left annotation information in the current environment, then the second user may acquire the captured image of the real object in the current environment through the application installed on the second terminal device, such as the AR software, and send the acquisition request to the server.

Correspondingly, on the server side, the server receives the acquisition request sent by the second terminal device, and the acquisition request is used to indicate the case that the second terminal device acquires the second captured image for the real object.

S105, in response to the acquisition request, send the annotation information to the second terminal device.

Specifically, the execution body of this step is the server. After receiving the acquisition request, the server sends to the second terminal device the annotation information that is sent by the first terminal device and is stored by the server.

Correspondingly, on the second terminal device side, the second terminal device receives the annotation information of the real object returned by the server.

S106, display the annotation information corresponding to the real object on the second captured image.

Specifically, the execution body of this step is the second terminal device. After receiving the annotation information, the second terminal device may display the annotation information correspondingly on the real object in the second captured image acquired by the second terminal device, thus allowing the second user to view the virtual creation content left by the first user on the real object.

In an embodiment of the present disclosure, the method further includes: receiving reply information sent by the second terminal device for the annotation information, and displaying the reply information.

Specifically, after viewing the annotation information left by the first user on the real object, the second user may give reply information, like forward, click Like button, and comment on the annotation information, send the information of the forward, the click Like button, and the comment to the server next, and then feed it back to the first terminal device through the server, and display the information of the forward, the click Like button, and the comment on the first terminal device. Alternatively, the second user may add the first user as a friend according to the contact information left by the first user, and directly send the information of the forward, the click Like button, and the comment to the first terminal device. In an implementation, the second user may not reply to the annotation information left by the first user, but perform his required virtual creation on the real object.

The information interaction method provided by this embodiment includes: acquiring a first captured image for a real object and displaying the first captured image; in response to a user input operation for the real object in the first captured image, generating, based on input information from the user input operation, annotation information of the real object; and sending the annotation information of the real object to a server; where the annotation information, in case that a second terminal device acquires a second captured image for the real object, is sent by the server to the second terminal device and is displayed, corresponding to the real object, by the second terminal device on the second captured image. That is, in the embodiment of the present disclosure, a user may realize information interaction with other users who come here later by virtual creation of the real object, which enriches the social way.

Figure 4:
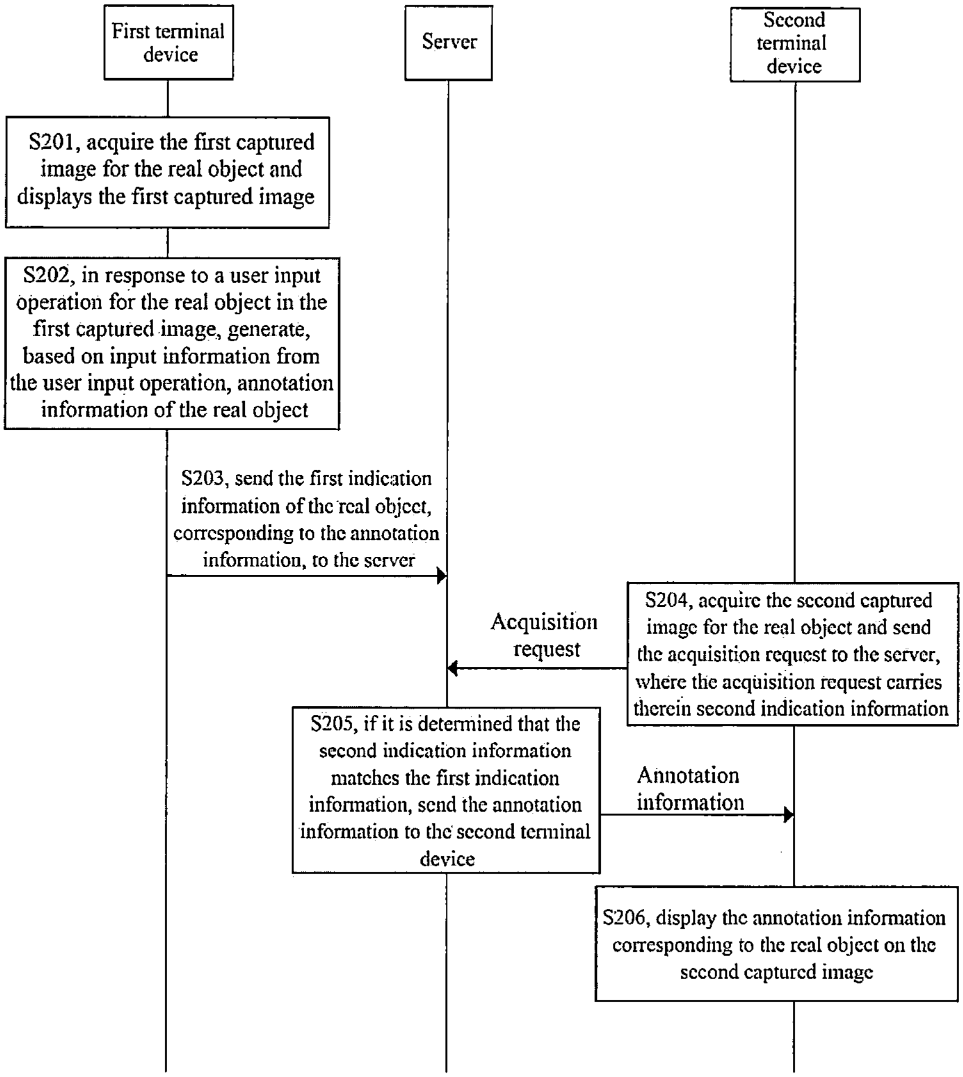
FIG. 4 is flow chart II of an information interaction method provided by an embodiment of the present disclosure.

Referring to FIG. 4, FIG. 4 is flow chart II of an information interaction method provided by an embodiment of the present disclosure. The information interaction method includes the following.

S201, the first terminal device acquires the first captured image for the real object and displays the first captured image.

S202, in response to a user input operation for the real object in the first captured image, the first terminal device generates, based on input information from the user input operation, annotation information of the real object.

In this embodiment, the step S201 and the step S202 are the same as the step S101 and the step S102 in the above embodiment. Please refer to the description of the step S101 and the step S102 for the details, which will not be repeated herein.

S203, the first terminal device sends the first indication information of the real object, corresponding to the annotation information, to the server.

Where the annotation information, in case that the second terminal device determines that the second captured image matches the first indication information, is specifically sent by the server to the second terminal device, and is displayed, corresponding to the real object, by the second terminal device on the second captured image.

Specifically, the first indication information is the identification of the real object; that is, in this step, the first terminal device sends the identification of the real object and the annotation information created by the first user to the server.

S204, the second terminal device acquires the second captured image for the real object and sends the acquisition request to the server, where the acquisition request carries second indication information.

Where the second indication information is specifically used to determine whether the second captured image acquired by the second terminal device matches the first indication information.

Specifically, after acquiring the second captured image for the real object, the second terminal device recognizes the identification of the real object in the second captured image (that is, the second indication information), carries the second indication information in the acquisition request and sends it to the server.

Correspondingly, on the server side, the server receives the acquisition request sent by the second terminal device, where the acquisition request carries the second indication information.

S205, if determining that the second indication information matches the first indication information, the server sends the annotation information to the second terminal device.

Specifically, in case that the server determines that the second indication information matches the first indication information, it indicates that the second captured image matches the first indication information. At this point, the server sends the annotation information to the second terminal device.

S206, display the annotation information corresponding to the real object on the second captured image.

In this embodiment, the step S206 is the same as the step S106 in the above embodiment. Please refer to the step S106 for the detailed description, which will not be repeated herein.

In an embodiment of the present disclosure, on the server side, the first indication information includes the image of the real object extracted from the first captured image and the location information of the first terminal device; in case that the location information of the second terminal device matches the location information of the first terminal device and the second captured image matches the image of the real object, the second captured image matches the first indication information.

Correspondingly, on the server side, the first indication information includes an image of the real object extracted from the first captured image and location information of the first terminal device; the second indication information includes an image of the real object extracted from the second captured image and location information of the second terminal device; and the sending the annotation information to the second terminal device, in response to the acquisition request, specifically includes: if it is determined that the location information of the second terminal device matches the location information of the first terminal device, and the image of the real object extracted from the second captured image matches the image of the real object extracted from the first captured image, sending the annotation information to the second terminal device.

Correspondingly, on the second terminal device side, in case that the first indication information includes an image of the real object extracted from the first captured image and location information of the first terminal device; the second indication information includes an image of the real object extracted from the second captured image and location information of the second terminal device; and in case that the location information of the second terminal device matches the location information of the first terminal device, and the image of the real object extracted from the second captured image matches the image of the real object extracted from the first captured image, the second captured image matches the first indication information.

Specifically, after acquiring the first captured image for the real object, the first terminal device may not only receive the annotation information generated based on the input operation by the first user, but also extract the image of the real object from the first captured image and acquire the location information of the first terminal device. Next, the first terminal device may send the annotation information, the image of the real object and the location information of the first terminal device to the server for corresponding storage; when the second user holding the second terminal device arrives at a place and wants to acquire the annotation information, the second user may acquire the second captured image for the real object through the application of the second terminal device (such as the AR software), and extract the image of the real object from the second captured image and acquire the location information of the second terminal device at the same time. And then the second terminal device may carry the image of the real object and the location information of the second terminal device in the acquisition request and send them to the server. After receiving the acquisition request sent by the second terminal device, the server determines whether the image of the real object sent by the second terminal device matches the image of the real object stored by the server (that is, the image of the real object sent by the first terminal device), and whether the location information of the second terminal device matches the location information pre-stored in the server (that is, the location information of the first terminal device), if results of both of the above cases are 'match', the server may return the corresponding annotation information to the second terminal device; and if one of the results of the above two cases is 'Do not match', it is illustrated that matching annotation information is not available to the server, and the server returns a blank. It should be noted that, in this embodiment, the annotation information may be returned only when the location information and the image of the real object are both matched, which improves the accuracy of information interaction.

In an embodiment of the present disclosure, on the server side, the first indication information includes an image of the real object extracted from the first captured image and location information of the first terminal device; the acquisition request carries location information of the second terminal device, and the sending the annotation information to the second terminal device, in response to the acquisition request, specifically includes: if it is determined that the location information of the second terminal device matches the location information of the first terminal device, sending prompt information to the second terminal device; where the prompt information is used to indicate that an area represented by the location information of the second terminal device includes the annotation information; receiving an image of the real object extracted from the second captured image sent by the second terminal device; and if it is determined that the image of the real object extracted from the second captured image matches the image of the real object extracted from the first captured image, sending the annotation information to the second terminal device.

Correspondingly, on the second terminal device side, the first indication information includes an image of the real object extracted from the first captured image and location information of the first terminal device; the acquisition request carries location information of the second terminal device, and the method further includes: if it is determined that the location information of the second terminal device matches the location information of the first terminal device, receiving prompt information sent by a server, where the prompt information is used to indicate that an area represented by the location information of the second terminal device includes the annotation information; sending the image of the real object extracted from the second captured image to the server; and if it is determined that the image of the real object extracted from the second captured image matches the image of the real object extracted from the first captured image, executing a step of receiving the annotation information of the real object returned by the server.

Specifically, after the first terminal device sends the annotation information, the image of the real object and the location information of the first terminal device to the server for corresponding storage, the second terminal device may actively report, or the server may actively detect, the location information of the second terminal device. After acquiring the location information of the second terminal device, the server may determine whether the location information of the second terminal device matches the location information of the first terminal device stored by the server; if it matches, it indicates that the second terminal device is available to the area represented by the location information of the first terminal device; at this point, the server may send the prompt information to the second terminal device, so as to remind the second user who holds the second terminal device that there is annotation information in the current area; if the second user wants to acquire the annotation information, the image of a real object in the current area may be scanned through the application on the second terminal device and the image of the real object is sent to the server. In case that the server determines that the image of the real object sent by the second terminal device matches the stored image of the real object, the server sends the annotation information to the second terminal device.

That is to say, in this embodiment, the server matches the location information first, and only after the location information is matched, the second terminal device may be reminded to send the image of the real object, thus saving data transmission resources; in addition, the server first performs location information matching, filters out the annotation information corresponding to the location information from a large number of pre-stored annotation information, and then matches the corresponding annotation information according to the image of the real object sent by the second terminal device, thereby improving the efficiency of information interaction.

In an implementation, the location information of the first terminal device is used to represent the location of the first terminal device, or the location information of the first terminal device is used to represent the location of the first target object, where the location of the first terminal device includes latitude and longitude information, orientation and height information of the first terminal device. In an implementation, the latitude and longitude information may be acquired by the location based services (LBS) technology, and the orientation and height information may be acquired by the sensor of the terminal device. Typically, there are still some errors in the acquired location information. Therefore, in this embodiment, further matching operation is necessary to the images of real objects.

On the basis of the foregoing embodiments, through sending first indication information and the annotation information of the real object to the server correspondingly; where the annotation information, in case that the second terminal device determines that the second captured image matches the first indication information, is specifically sent by the server to the second terminal device, and is displayed, corresponding to the real object, by the second terminal device on the second captured image; that is, through quickly finding the corresponding annotation information by the indication information in the embodiment of the present disclosure, the efficiency of information interaction is improved.

Figure 5:
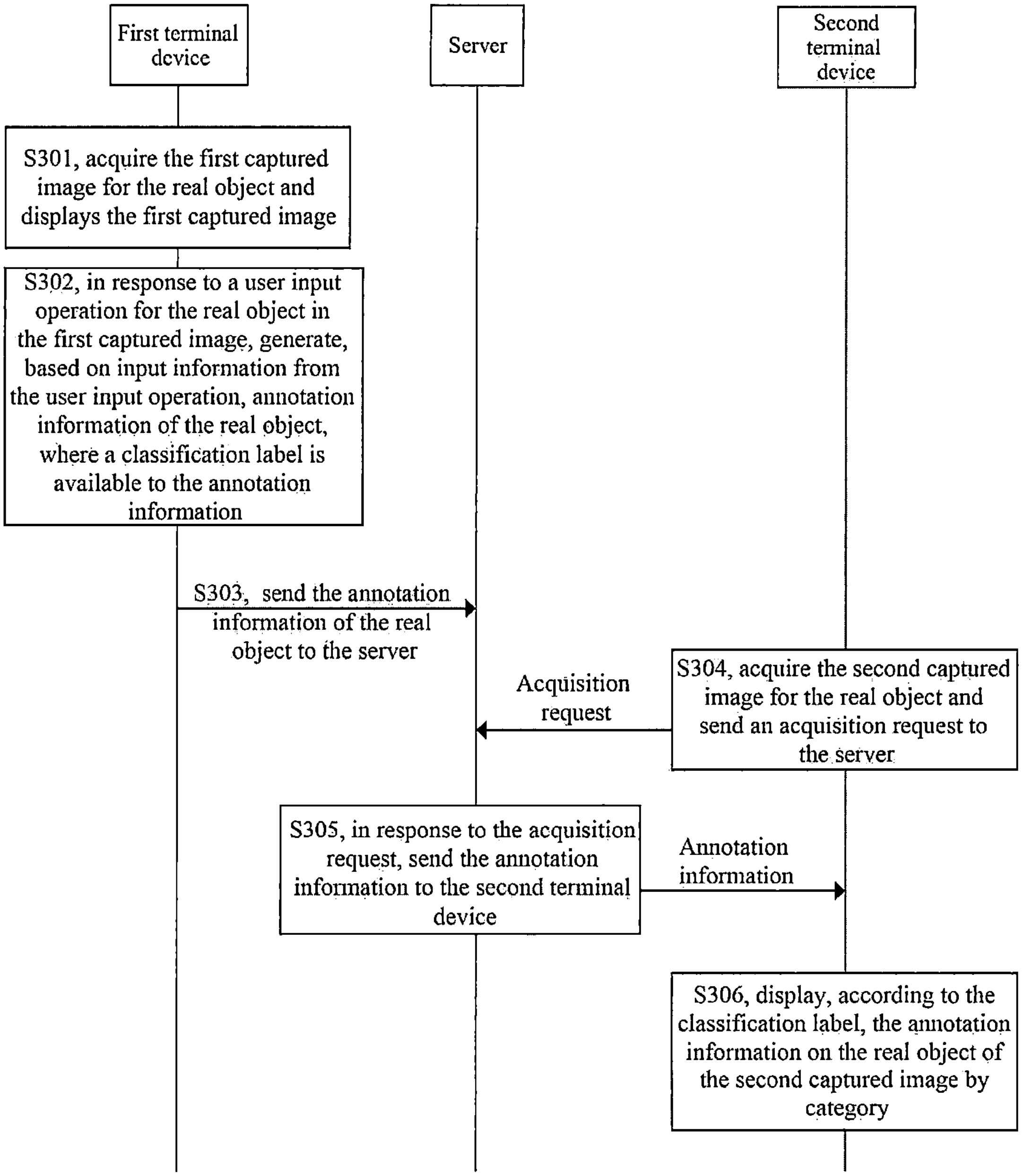
FIG. 5 is flow chart III of an information interaction method provided by an embodiment of the present disclosure.

Referring to FIG. 5, FIG. 5 is flow chart III of an information interaction method provided by an embodiment of the present disclosure. The information interaction method includes the following.

S301, the first terminal device acquires the first captured image for the real object and displays the first captured image.

In this embodiment, the step S301 the same as the step S101 in the above embodiment. Please refer to the description of the step S101 for details, which will not be repeated herein.

S302, in response to a user input operation for the real object in the first captured image, the first terminal device generates, based on input information from the user input operation, annotation information of the real object, where a classification label is available to the annotation information.

The classification label is used for the classification display in case of displaying the annotation information by the second terminal device.

Specifically, after generating the annotation information of the real object, the first user may also set the classification label for the annotation information through the first terminal device.

In an implementation, the classification label is set in following ways: in response to the trigger instruction of the user, the classification label is set for the annotation information of the real object; or the annotation information of the real object is identified to acquire the classification label of the annotation information of the real object.

Specifically, the user may customize the classification label setting, that is, the first terminal device may set the classification label for the annotation information in response to the trigger instruction of the user, or the first terminal device may automatically acquire, according to the identification result of contents of the labeling information, the corresponding classification label of the annotation information. That is to say, the user may either set a new classification label for the newly created annotation information or classify the newly created annotation information into the existing classification label; or the first terminal device may identify the contents of the newly created annotation information, and automatically create, according to the identification result, a new classification label or classify them into the existing classification label.

In an implementation, the classification label may have hierarchical attributes, that is, users may set one or more parent labels as required, and each parent label includes a number of first-level sub-labels, and each of which includes a number of second-level sub-labels, and so on. The number of hierarchies is not limited by the present disclosure. For example, it is assumed that user C takes the user identification as the parent label, and under the parent table, a user contact sub-label, a landscape sub-label, a selfie sub-label, a small game sub-label, etc. may be set.

S303, the first terminal device sends the annotation information of the real object to the server.

Specifically, the annotation information stored in the server has classification labels.

In addition, in case that the first terminal device does not set the classification label for the annotation information, that is, the annotation information received by the server does not have the classification label, the server may identify the annotation information of the real object to acquire the classification label of the annotation information of the real object. That is, the classification label may be set for the annotation information through the first terminal device or the server.

S304, the second terminal device acquires the second captured image for the real object and sends an acquisition request to the server.

In this embodiment, the step S304 is the same as the step S104 in the above embodiment. Please refer to the description of the step S104 for details, which will not be repeated herein.

S305, in response to the acquisition request, the server sends the annotation information to the second terminal device.

Specifically, the annotation information sent by the server to the second terminal device has the classification label.

S306, the second terminal device displays, according to the classification label, the annotation information on the real object of the second captured image by category.

Specifically, there may be a large amount of annotation information on the real object, and it is difficult for the second user to find his interested annotation information. Therefore, in this embodiment, the classification label may be set for each piece of annotation information, and the server may return the annotation information with the classification label to the second user; when the second user is interested in a content of a label, he may click on the classification label, so as to acquire the annotation information corresponding to the classification label. For example, it is assumed that both a user C and a user D have left annotation information on a building wall, and the annotation information of the user C has a label C, and the annotation information of the user D has a label D; at this point, if a user E exists, after scanning the building wall, the label C and the label D may be displayed on the terminal device of the user E. If the user E is interested in the user C, the user E may click the label C to acquire the annotation information of the user C. Of course, the label C may be classified into multiple sub-labels, and the user E may click corresponding sub-label to acquire the corresponding annotation information.

On the basis of the foregoing embodiment, by setting the classification label for the annotation information of the real object, the second terminal device may display, according to the classification label, the annotation information on the real object on the second captured image by category, which may help the user to quickly find his interested information, thereby improving the user experience.

Figure 6:
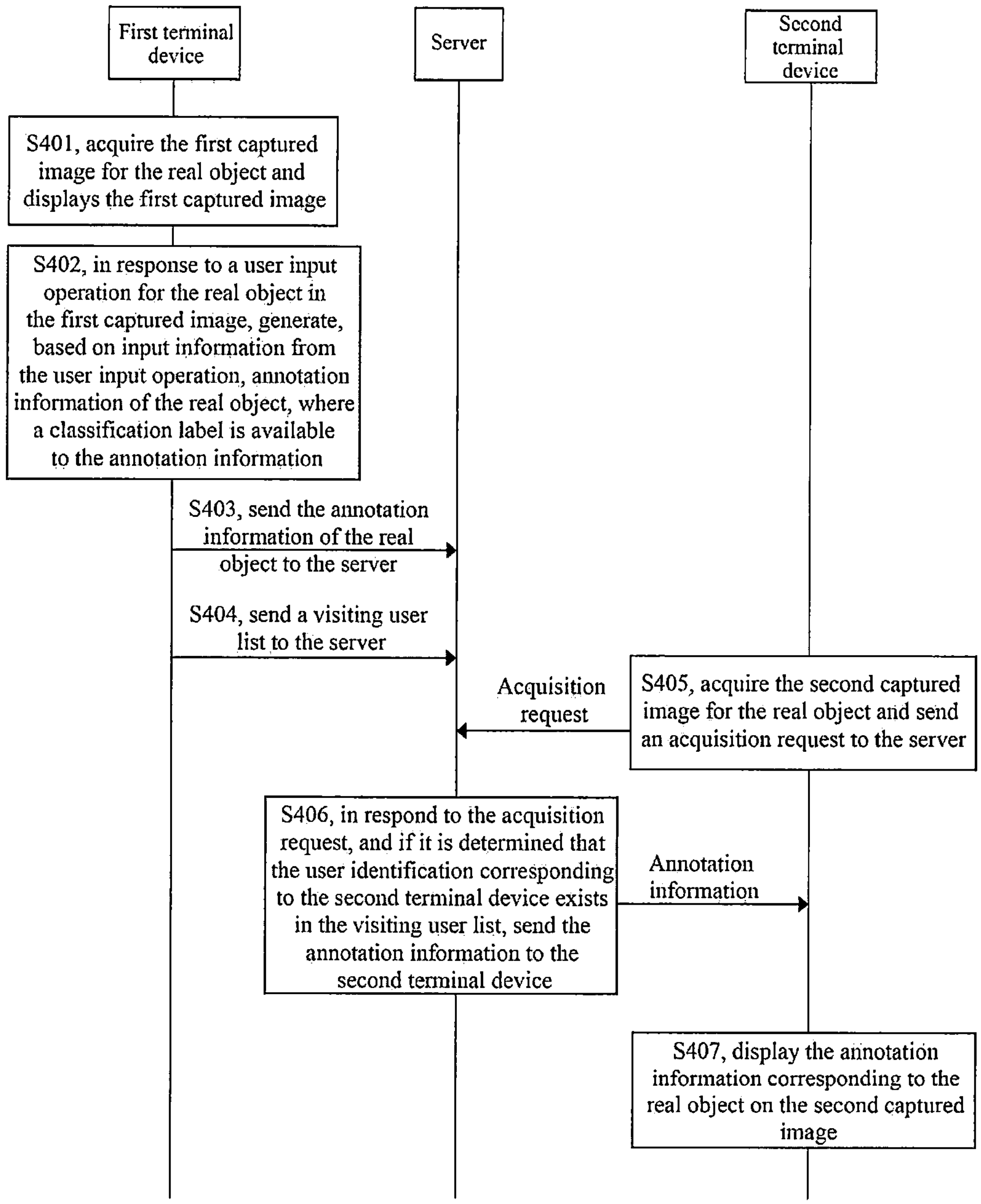
FIG. 6 is flow chart IV of an information interaction method provided by an embodiment of the present disclosure.

Referring to FIG. 6, FIG. 6 is flow chart IV of an information interaction method provided by an embodiment of the present disclosure. The information interaction method includes the following.

S401, the first terminal device acquires the first captured image for the real object and displays the first captured image.

S402, in response to a user input operation for the real object in the first captured image, the first terminal device generates, based on input information from the user input operation, annotation information of the real object.

S403, send the annotation information of the real object to the server.

In this embodiment, the step S401, the step S402 and the step S403 are the same as the step S101, the step S102 and the step S103 in the above embodiment. Please refer to the description of the steps S101, the step S102 and the step S103 for details, which will not be repeated herein.

S404, the first terminal device sends a visiting user list to the server.

The visiting user list includes the user identifications that allow to acquire the annotation information.

Specifically, the first user may set the member who may read the annotation information as required (for example, viewable by good friends only, viewable by all, or viewable by self, etc.), that is, the corresponding visiting user list is determined and sent to the server. It should be noted that there is no sequence between the step S401 and the step S403, which may be performed at the same time.

Correspondingly, on the server side, the server receives the visiting user list sent by the first terminal device.

S405, the second terminal device acquires the second captured image for the real object and sends an acquisition request to the server.

S406, in respond to the acquisition request, and if it is determined that the user identification corresponding to the second terminal device exists in the visiting user list, the server sends the annotation information to the second terminal device.

Specifically, the server may acquire the user identification corresponding to the second terminal device, and determine whether the user identification of the second terminal device exists in the visiting user list; if the user identification exists in the visiting user list, it indicates that the second terminal device is allowed to access the annotation information of the real object. Therefore, the server may return the annotation information to the second terminal device, and then, the step S406 may be performed consecutively.

If the second terminal device does not exist in the visiting user list, it indicates that the second user is not allowed to access the annotation information of the real object; at this point, the server does not return the annotation information of the real object to the second terminal device.

In an implementation, in case that the user identification corresponding to the second terminal device does not exist in the visiting user list, the server may return rejection information to the second terminal device and display it, where the rejection information indicates that the second terminal device cannot access the annotation information of the real object; correspondingly, on the second terminal device side, the second terminal device may receive and display the rejection information returned by the server.

In an implementation, the user may also set a blacklist, where there is a user identification that is not allowed to access the annotation information of the real object. The server may determine whether the user identification corresponding to the second terminal device exists in the blacklist; if the user identification corresponding to the second terminal device does not exist in the blacklist, the annotation information may be returned to the second terminal device; if the user identification corresponding to the second terminal device exists in the blacklist, the annotation information may not be returned.

S407, the second terminal device displays the annotation information corresponding to the real object on the second captured image.

In this embodiment, the step S407 is the same as the step S106 in the above embodiment. Please refer to the description of the step S106 for details, which will not be repeated herein.

In particular, the embodiments of the present disclosure are described in further detail below. First, the first user shoots a real object through the AR software of the first terminal device to acquire a captured image, and then receives the AR creation of the real object by the user on the captured image, to acquire AR contents, and at the same time, to acquire the image of the real object the location information of the first terminal device and the visiting user list; and then the first terminal device sends the annotation information, the image of the real object, the location information of the first terminal device and the terminal access list to the server for storage. If the second terminal device enters the area represented by the location information stored in the server, and the second terminal device exists in the visiting user list, the server may send prompt information to the second terminal device; the second terminal device acquires the image of the real object in the area according to the prompt information, and sends the image of the real object to the server, and then the server finds the matched annotation information according to the image of the real object and returns it to the second terminal device; and the second terminal device performs classified display according to the classification labels of the labeling information, so that the second user may click a interested label to display the corresponding annotation information.

In addition, the present disclosure may be applied in many fields, for example, guests attending a gym want to determine who else is coming to the gym, or candidates want to look for someone in the library who is also preparing for the exam; or users may leave comments about a store on a wall of a mall for other users' reference, or merchants may also leave their virtual routes on walls and roads, so that customers may successfully navigate according to the virtual routes; or the merchants may paste small virtual advertisements on the wall, which avoids the impact of small paper advertisements on the environment and reduces the cost.

On the basis of the foregoing embodiment, by setting the visiting user list, the users who allow to acquire the annotation information are determined, thereby improving the user experience.

Figure 7:
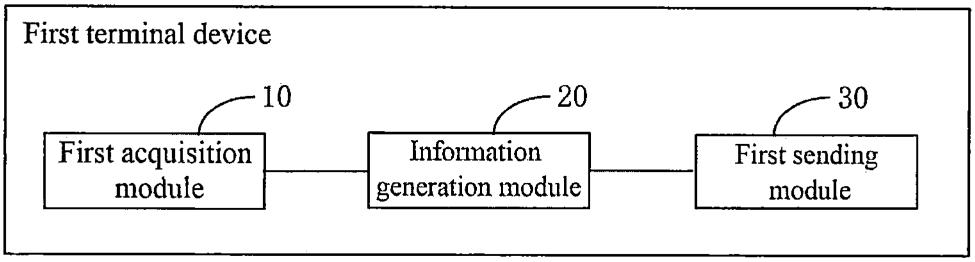
FIG. 7 is a structural block diagram of a first terminal device provided by an embodiment of the present disclosure.

Corresponding to the information interaction method of the above embodiment, FIG. 7 is a structural block diagram of a first terminal device provided by an embodiment of the present disclosure. For ease of explanation, only the parts related to the embodiments of the present disclosure are shown. Referring to FIG. 7, the first terminal device includes: a first acquisition module 10, an information generation module 20 and a first sending module 30.

The first acquisition module 10 is configured to acquire a first captured image for a real object and display the first captured image; the information generation module 20 is configured to generate, based on input information from a user input operation, annotation information of the real object, in response to the user input operation for the real object in the first captured image; and a first sending module 30 is configured to send the annotation information of the real object to a server; where the annotation information, in case that a second terminal device acquires a second captured image for the real object, is sent by the server to the second terminal device, and is displayed, corresponding to the real object, by the second terminal device on the second captured image.

In an embodiment of the present disclosure, the first sending module 30 is specifically configured to send first indication information and the annotation information of the real object to the server correspondingly; where the annotation information, in case that the second terminal device determines that the second captured image matches the first indication information, is specifically sent by the server to the second terminal device, and is displayed, corresponding to the real object, by the second terminal device on the second captured image.

In an embodiment of the present disclosure, the first indication information includes an image of the real object extracted from the first captured image and location information of the first terminal device; and in case that location information of the second terminal device matches the location information of the first terminal device and the second captured image matches the image of the real object, the second captured image matches the first indication information.

In an embodiment of the present disclosure, the annotation information includes a classification label; and where the classification label is used for classification display in case of displaying the annotation information by the second terminal device.

In an embodiment of the present disclosure, the first sending module 30 is further configured to send a visiting user list to a server; where the visiting user list includes user identifications that allow to acquire the annotation information.

In an embodiment of the present disclosure, the information generation module 20 is specifically configured to acquire a two-dimensional plane of the real object in the first captured image; and in response to the user input operation for the two-dimensional plane, generate, based on the input information from the user input operation, the annotation information of the real object.

In an embodiment of the present disclosure, the first acquisition module 10 is further configured to receive reply information for the labeling information sent by the second terminal device, and display the reply information.

The first terminal device provided in this embodiment may be used to execute the technical solutions of the above method embodiments, and the implementation principles and the technical effects thereof are similar, which will not be repeated in this embodiment.

Figure 8:
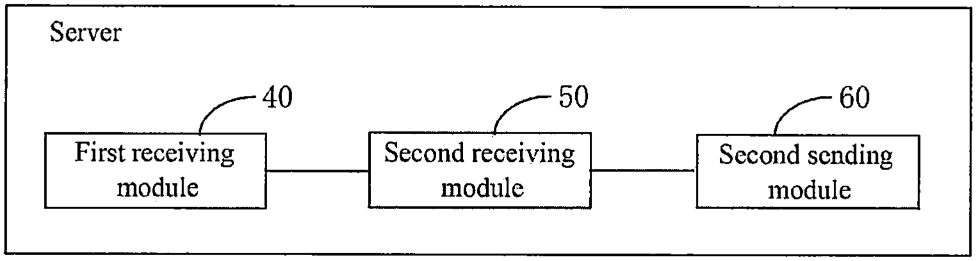
FIG. 8 is a structural block diagram of a server provided by an embodiment of the present disclosure.

FIG. 8 is a structural block diagram of a server provided by an embodiment of the present disclosure. For ease of explanation, only the parts related to the embodiments of the present disclosure are shown. Referring to FIG. 8, the server includes a first receiving module 40, a second receiving module 50 and a second sending module 60.

The first receiving module 40 is configured to receive annotation information of a real object sent by a first terminal device; where the annotation information, in response to a user input operation for the real object in a first captured image, is generated by the first terminal device based on input information from the user input operation, and the first captured image is acquired through the first terminal device and for the real object; the second receiving module 50 is configured to receive an acquisition request sent by a second terminal device, where the acquisition request is used for indicating a case that the second terminal device acquires a second captured image for the real object; and the second sending module 60 is configured to send the annotation information to the second terminal device, in response to the acquisition request.

In an embodiment of the present disclosure, the first receiving module 40 is specifically configured to receive first indication information and the annotation information of the real object correspondingly sent by the first terminal device; where the acquisition request carries the second indication information, and the second sending module 60 is specifically configured to: if it is determined that the second indication information matches the first indication information, send the annotation information to the second terminal device. In an embodiment of the present disclosure, the first indication information includes an image of the real object extracted from the first captured image and location information of the first terminal device; the second indication information includes an image of the real object extracted from the second captured image and location information of the second terminal device; the second sending module 60 is specifically configured to: if it is determined that the location information of the second terminal device matches the location information of the first terminal device, and the image of the real object extracted from the second captured image matches the image of the real object extracted from the first captured image, send the annotation information to the second terminal device.

In an embodiment of the present disclosure, the first indication information includes an image of the real object extracted from the first captured image and location information of the first terminal device; the acquisition request carries location information of the second terminal device, and the second sending module 60 is specifically configured to: if it is determined that the location information of the second terminal device matches the location information of the first terminal device, send the prompt information to the second terminal device; where the prompt information is used to indicate that an area represented by the location information of the second terminal device includes the annotation information; the second receiving module 50 is further configured to: receive an image of the real object extracted from the second captured image sent by the second terminal device; and the second sending module 60 is further specifically configured to: if it is determined that the image of the real object extracted from the second captured image matches the image of the real object extracted from the first captured image, send the annotation information to the second terminal device.

In an embodiment of the present disclosure, the first receiving module 40 is further configured to receive the visiting user list sent by the first terminal device; and the second sending module 60 is specifically configured to: if it is determined that the user identification corresponding to the second terminal device exists in the visiting user list, execute the step of sending the annotation information to the second terminal device.

The server provided by this embodiment may be used to execute the technical solutions of the above method embodiments, and the implementation principles and the technical effects thereof are similar, which will not be repeated in this embodiment.

Figure 9:
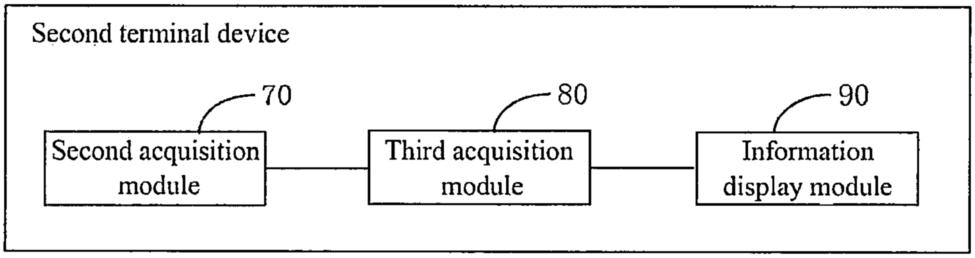
FIG. 9 is a structural block diagram of a second terminal device provided by an embodiment of the present disclosure.

FIG. 9 is a structural block diagram of a second terminal device provided by an embodiment of the present disclosure. For ease of explanation, only the parts related to the embodiments of the present disclosure are shown. Referring to FIG. 9, the second terminal device includes a second acquisition module 70, a third receiving module 80, and an information display module 90.

The second acquisition module 70 is configured to acquire a second captured image for a real object, and send an acquisition request to a server; where the server stores annotation information of the real object sent by a first terminal device, the annotation information is generated by the first terminal device, based on input information from a user input operation, in response to the user input operation for the real object in a first captured image, and the first captured image is acquired through the first terminal device and for the real object; the third receiving module 80 is configured to receive the annotation information of the real object returned by the server; and the information display module 90 is configured to display the annotation information, corresponding to the real object, on the second captured image.

In an embodiment of the present disclosure, the server further stores first indication information of the real object sent by the first terminal device; the acquisition request carries second indication information; where the second indication information is specifically used to determine whether the second captured image acquired by the second terminal device matches the first indication information.

In an embodiment of the present disclosure, the first indication information includes an image of the real object extracted from the first captured image and location information of the first terminal device; the second indication information includes an image of the real object extracted from the second captured image and location information of the second terminal device; in case that the location information of the second terminal device matches the location information of the first terminal device, and the image of the real object extracted from the second captured image matches the image of the real object extracted from the first captured image, the second captured image matches the first indication information.

In an embodiment of the present disclosure, the first indication information includes an image of the real object extracted from the first captured image and location information of the first terminal device; the acquisition request carries location information of the second terminal device, and the third receiving module 80 is further configured to: if it is determined that the location information of the second terminal device matches the location information of the first terminal device, receive prompt information sent by a server, where the prompt information is used to indicate that an area represented by the location information of the second terminal device includes the annotation information; send the image of the real object extracted from the second captured image to the server; if it is determined that the image of the real object extracted from the second captured image matches the image of the real object extracted from the first captured image, execute the step of receiving the annotation information of the real object returned by the server.

In an embodiment of the present disclosure, the annotation information includes a classification label; and the information display module 90 is specifically configured to display, according to the classification label, the annotation information on the real object of the second captured image by category.

The second terminal device provided in this embodiment may be used to execute the technical solutions of the above method embodiments, and the implementation principles and the technical effects thereof are similar, which will not be repeated in this embodiment.

Figure 10:
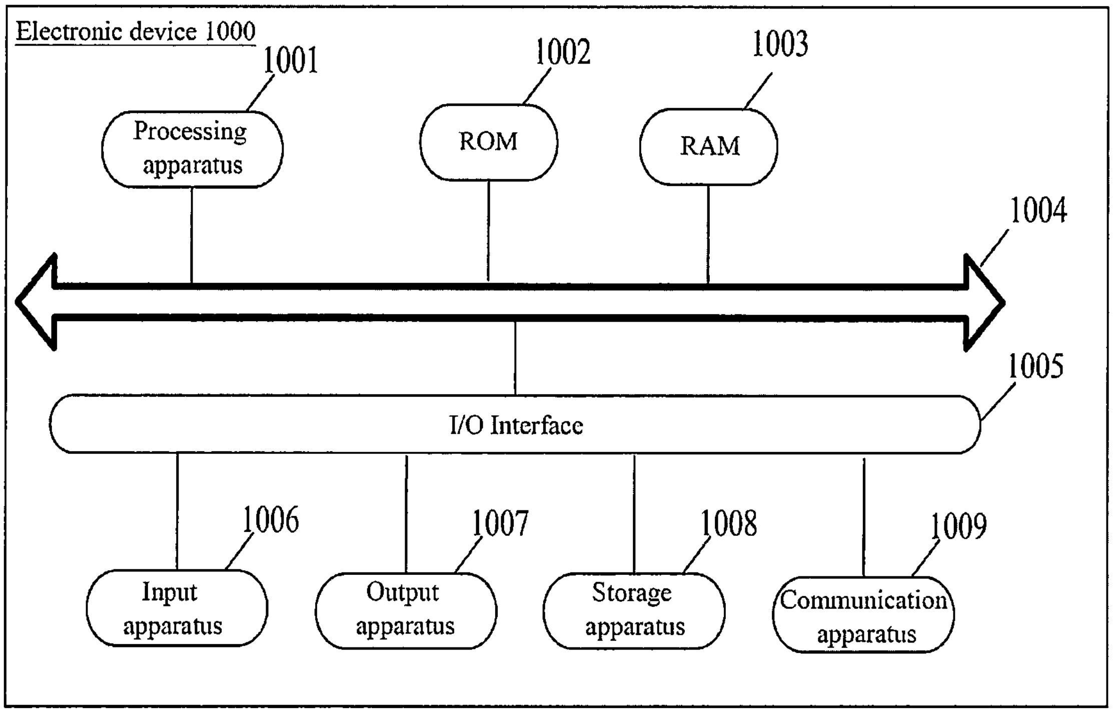
FIG. 10 is a schematic diagram of a hardware structure of an electronic device provided by an embodiment of the present disclosure.

Referring to FIG. 10, it shows a schematic structural diagram of an electronic device 1000 applicable to implement the embodiment of the present disclosure, and the electronic device 1000 may be a first terminal device, a second terminal device or a server. Where the terminal device may include, but is not limited to, a mobile terminal such as a mobile phone, a laptop, a digital broadcast receiver, a personal digital assistant (PDA for short), a portable android device (PAD for short), a portable multimedia player (PMP for short), an on-board terminal (for example, an on-board navigation terminal device). The electronic device 1000 shown in FIG. 10 is only an example, and should not impose any limitation on the function and the scope of use of the embodiment of the present disclosure.

As shown in FIG. 10, the electronic device 1000 may include a processing apparatus (such as a central processing unit and a graphics processor) 1001, which may perform various appropriate actions and processes according to a program stored in a read only memory (ROM for short) 1002 or a program loaded from a storage apparatus 1008 into a random access memory (RAM for short) 1003. The RAM 1003 also stores various programs and data required for the operation of the electronic device 1000. The processing apparatus 1001, the ROM 1002, and the RAM 1003 are connected to each other through a bus 1004. An input/output (I/O) interface 1005 is also connected to the bus 1004.

Generally, the following apparatuses may be connected to the I/O interface 1005: an input apparatus 1006 including, such as a touch screen, a touch panel, a keyboard, a mouse, a camera, a microphone, an accelerometer, a gyroscope; an output apparatus 1007 including, such as a liquid crystal display (LCD for short), a speaker, a vibrator; a storage apparatus 1008 including, such as a magnetic tape and a hard disk; and a communication apparatus 1009. The communication apparatus 1009 may allow the electronic device 1000 to perform wireless or wired communication with other devices to exchange data. Although FIG. 10 shows the electronic device 1000 with various apparatuses, it should be understood that it is not required to implement nor have all the apparatuses shown. More or fewer apparatuses may be implemented or provided instead.

Particularly, according to the embodiments of the present disclosure, the process described above with reference to the flowchart may be implemented as a computer software program. For example, the embodiments of the present disclosure include a computer program product, which includes a computer program carried on a computer readable medium, and the computer program contains the program code for executing the method shown in the flowchart. In such an embodiment, the computer program may be downloaded and installed from the network through the communication apparatus 1009, or installed from the storage apparatus 1008, or installed from the ROM 1002. When the computer program is executed by the processing apparatus 1001, the above functions defined by the methods according to the embodiments of the present disclosure are executed.

It should be noted that the above computer-readable medium of the present disclosure may be a computer-readable signal medium or a computer-readable storage medium, or a combination of the above two. The computer-readable storage medium may be, for example, but not limited to, electrical, magnetic, optical, electromagnetic, infrared, or semiconductor systems, apparatus, or devices, or a combination of any of the above. More specific examples of the computer-readable storage medium may include, but are not limited to, an electrical connection with one or more wires, a portable computer diskette, a hard disk, a random access memory (RAM), a read only memory (ROM), an erasable programmable read only memory (EPROM or flash memory for short), optical fiber, a portable compact disk read only memory (CD-ROM for short), an optical storage device, a magnetic storage device, or any suitable combination of the above. In the present disclosure, the computer-readable storage medium may be any tangible medium that contains or stores a program that may be used by, or may be used in combination with, an instruction execution system, apparatus, or device. In the present disclosure, however, the computer-readable signal medium may include data signals propagated in baseband or as part of a carrier wave, and computer readable program codes are carried in the data signals. The data signal propagated in such a way may take various forms, including but not limited to an electromagnetic signal, an optical signal or any suitable combination of the above. The computer-readable signal medium may also be any computer-readable medium other than the computer-readable storage medium, which may transmit, propagate or transport a program that may be used by, or be used in combination with, the instruction execution system, apparatus, or device. The program code contained in the computer readable medium may be transmitted by any suitable medium, including but not limited to an electric wire, an optical cable, the RF (Radio Frequency), etc., or any suitable combination of the above.

The above computer readable medium may be contained in the above electronic device; or it may exist separately without being assembled into the electronic device.

The above computer readable medium carries one or more programs which, when executed by the electronic device, cause the electronic device to execute the methods according to the above embodiments.

Program codes used to execute the operations of the present disclosure may be written in one or more programming languages or their combinations, where the program codes include object-oriented programming languages such as Java, Smalltalk, C++, and conventional procedural programming languages such as the "C" language or similar programming languages. The program codes may be executed wholly or partly on a user computer, be executed as an independent software package, be executed partly on the user computer and partly on a remote computer, or be executed wholly on the remote computer or the server. In the case of a remote computer, the remote computer may be connected to the user computer through any kind of network, including the local area network (LAN for short) or the wide area network (WAN for short), or it may be connected to an external computer (for example, using an Internet service provider to connect through the Internet).

The flowchart and block diagram in the accompanying drawings illustrate possible architectures, functions, and operations of a system, a method, and a computer program product according to the embodiments of the present disclosure. In this regard, each box in the flowchart or the block diagram may represent a module, a program segment, or part of a code, which contain one or more executable instructions for implementing the specified logical function. It should also be noted that, in some alternative implementations, the functions marked in the box may also occur in a different order than those marked in the drawings. For example, two consecutive boxes may actually be executed in parallel, basically, and sometimes they may be executed in a reverse order, depending on the functions involved. It should also be noted that each box in the block diagram and/or the flowchart, and the combination of boxes in the block diagram and/or the flowchart, may be implemented by a dedicated hardware-based system that performs specified functions or operations, or may be implemented by a combination of dedicated hardware and computer instructions.

The modules involved in the embodiments described in the present disclosure may be implemented by software or hardware. A name of a module does not constitute a limitation on the unit itself in some cases.

The functions described above herein may be performed at least in part by one or more hardware logic components. For example, without limitation, exemplary types of hardware logic components that may be used include: a field programmable gate array (FPGA for short), an application specific integrated circuit (ASIC for short), an application specific standard product (ASSP for short), a system-on-chip (SOC for short), a complex programmable logic device (CPLD for short), etc.

In the context of the present disclosure, a machine-readable medium may be a tangible medium, which may contain or store a program for use by the instruction execution system, apparatus, or device, or for use in connection with the instruction execution system, apparatus, or device. The machine-readable medium may be a machine-readable signal medium or a machine-readable storage medium. The machine-readable medium may include, but not limited to the system, apparatus, or device in the following forms: electronic, magnetic, optical, electromagnetic, infrared, or semiconductor, or may include any suitable combination of the above. More specific examples of machine-readable storage medium may include the electrical connection based on one or more wires, a portable computer disk, the hard disk, the random access memory (RAM), the read-only memory (ROM), the erasable programmable read-only memory (EPROM or flash memory), the optical fiber, the portable compact disk read-only memory (CD-ROM), the optical storage device, the magnetic storage device, or any suitable combination of the above.

In the first aspect, according to one or more embodiments of the present disclosure, an information interaction method is provided, which is applied to a first terminal device, and the method includes: acquiring a first captured image for a real object and displaying the first captured image; in response to a user input operation for the real object in the first captured image, generating, based on input information from the user input operation, annotation information of the real object; and sending the annotation information of the real object to a server; where the annotation information, in case that a second terminal device acquires a second captured image for the real object, is sent by the server to the second terminal device and is displayed, corresponding to the real object, by the second terminal device on the second captured image.

According to one or more embodiments of the present disclosure, the sending the annotation information of the real object to the server specifically includes: sending first indication information and the annotation information of the real object to the server correspondingly; where the annotation information, in case that the second terminal device determines that the second captured image matches the first indication information, is specifically sent by the server to the second terminal device, and is displayed, corresponding to the real object, by the second terminal device on the second captured image.

According to one or more embodiments of the present disclosure, the first indication information includes an image of the real object extracted from the first captured image and location information of the first terminal device; and in case that location information of the second terminal device matches the location information of the first terminal device and the second captured image matches the image of the real object, the second captured image matches the first indication information.

According to one or more embodiments of the present disclosure, the annotation information includes a classification label; and where the classification label is used for classification display in case of displaying the annotation information by the second terminal device.

According to one or more embodiments of the present disclosure, the method further includes: sending a visiting user list to the server; where the visiting user list includes user identifications that allows to acquire the annotation information.

According to one or more embodiments of the present disclosure, in response to the user input operation for the real object in the first captured image, generating, based on the input information from the user input operation, the annotation information of the real object specifically includes: acquiring a two-dimensional plane of the real object in the first captured image; and in response to the user input operation for the two-dimensional plane, generating, based on the input information from the user input operation, the annotation information of the real object.

According to one or more embodiments of the present disclosure, the method further includes: receiving reply information for the labeling information sent by the second terminal device, and displaying the reply information.

In the second aspect, according to one or more embodiments of the present disclosure, an information interaction method is provided, which is applied to a server, and the method includes: receiving annotation information of a real object sent by a first terminal device; where the annotation information, in response to a user input operation for the real object in a first captured image, is generated by the first terminal device based on input information from the user input operation, and the first captured image is acquired through the first terminal device and for the real object; receiving an acquisition request sent by a second terminal device, where the acquisition request is used for indicating a case that the second terminal device acquires a second captured image for the real object; and sending the annotation information to the second terminal device, in response to the acquisition request.

According to one or more embodiments of the present disclosure, the receiving the annotation information of the real object sent by the first terminal device specifically includes: receiving first indication information and the annotation information of the real object correspondingly sent by the first terminal device; where the acquisition request carries second indication information, and the sending the annotation information to the second terminal device, in response to the acquisition request, specifically includes: if it is determined that the second indication information matches the first indication information, sending the annotation information to the second terminal device.

According to one or more embodiments of the present disclosure, the first indication information includes an image of the real object extracted from the first captured image and location information of the first terminal device; the second indication information includes an image of the real object extracted from the second captured image and location information of the second terminal device; and the sending the annotation information to the second terminal device, in response to the acquisition request, specifically includes: if it is determined that the location information of the second terminal device matches the location information of the first terminal device, and the image of the real object extracted from the second captured image matches the image of the real object extracted from the first captured image, sending the annotation information to the second terminal device.

According to one or more embodiments of the present disclosure, the first indication information includes an image of the real object extracted from the first captured image and location information of the first terminal device; the acquisition request carries location information of the second terminal device, and the sending the annotation information to the second terminal device, in response to the acquisition request, specifically includes: if it is determined that the location information of the second terminal device matches the location information of the first terminal device, sending prompt information to the second terminal device; where the prompt information is used to indicate that an area represented by the location information of the second terminal device includes the annotation information; receiving an image of the real object extracted from the second captured image sent by the second terminal device; and if it is determined that the image of the real object extracted from the second captured image matches the image of the real object extracted from the first captured image, sending the annotation information to the second terminal device.

According to one or more embodiments of the present disclosure, the method further includes: receiving the visiting user list sent by the first terminal device; and if it is determined that the user identification corresponding to the second terminal device exists in the visiting user list, executing the step of sending the annotation information to the second terminal device.

In the third aspect, according to one or more embodiments of the present disclosure, an information interaction method is provided, which is applied to a second terminal device, and the method includes: acquiring a second captured image for a real object, and sending an acquisition request to a server; where the server stores annotation information of the real object sent by a first terminal device, the annotation information is generated by the first terminal device, based on input information from a user input operation, in response to the user input operation for the real object in a first captured image, and the first captured image is acquired through the first terminal device and for the real object; receiving the annotation information of the real object returned by the server; and displaying the annotation information, corresponding to the real object, on the second captured image.

According to one or more embodiments of the present disclosure, the server further stores first indication information of the real object sent by the first terminal device; the acquisition request carries second indication information; where the second indication information is specifically used to determine whether the second captured image acquired by the second terminal device matches the first indication information.

According to one or more embodiments of the present disclosure, the first indication information includes an image of the real object extracted from the first captured image and location information of the first terminal device; the second indication information includes an image of the real object extracted from the second captured image and location information of the second terminal device; in case that the location information of the second terminal device matches the location information of the first terminal device, and the image of the real object extracted from the second captured image matches the image of the real object extracted from the first captured image, the second captured image matches the first indication information.

According to one or more embodiments of the present disclosure, the first indication information includes an image of the real object extracted from the first captured image and location information of the first terminal device; the acquisition request carries location information of the second terminal device, and the method further includes: if it is determined that the location information of the second terminal device matches the location information of the first terminal device, receiving prompt information sent by a server, where the prompt information is used to indicate that an area represented by the location information of the second terminal device includes the annotation information; sending the image of the real object extracted from the second captured image to the server; and if it is determined that the image of the real object extracted from the second captured image matches the image of the real object extracted from the first captured image, executing a step of receiving the annotation information of the real object returned by the server.

According to one or more embodiments of the present disclosure, the annotation information includes a classification label; and the displaying the annotation information, corresponding to the real object, on the second captured image includes: displaying, according to the classification label, the annotation information on the real object of the second captured image by category.

In the fourth aspect, according to one or more embodiments of the present disclosure, a first terminal device is provided, which includes a first acquisition module, configured to acquire a first captured image for a real object and display the first captured image; an information generation module, configured to generate, based on input information from a user input operation, annotation information of the real object, in response to the user input operation for the real object in the first captured image; and a first sending module, configured to send the annotation information of the real object to a server; where the annotation information, in case that a second terminal device acquires a second captured image for the real object, is sent by the server to the second terminal device, and is displayed, corresponding to the real object, by the second terminal device on the second captured image.

According to one or more embodiments of the present disclosure, the first sending module is specifically configured to: send first indication information and the annotation information of the real object to the server correspondingly; where the annotation information, in case that the second terminal device determines that the second captured image matches the first indication information, is specifically sent by the server to the second terminal device, and is displayed, corresponding to the real object, by the second terminal device on the second captured image.

According to one or more embodiments of the present disclosure, the first indication information includes an image of the real object extracted from the first captured image and location information of the first terminal device; and in case that location information of the second terminal device matches the location information of the first terminal device and the second captured image matches the image of the real object, the second captured image matches the first indication information.

According to one or more embodiments of the present disclosure, the annotation information includes a classification label; and where the classification label is used for classification display in case of displaying the annotation information by the second terminal device.

According to one or more embodiments of the present disclosure, the first sending module is further configured to send a visiting user list to a server; where the visiting user list includes user identifications that allow to acquire the annotation information.

According to one or more embodiments of the present disclosure, the information generation module is specifically used to acquire a two-dimensional plane of the real object in the first captured image; and in response to the user input operation for the two-dimensional plane, generate, based on the input information from the user input operation, the annotation information of the real object.

According to one or more embodiments of the present disclosure, the first acquisition module is further configured to receive reply information for the labeling information sent by the second terminal device, and display the reply information.

In the fifth aspect, according to one or more embodiments of the present disclosure, a server is provided, including: a first receiving module, configured to receive annotation information of a real object sent by a first terminal device; where the annotation information, in response to a user input operation for the real object in a first captured image, is generated by the first terminal device based on input information from the user input operation, and the first captured image is acquired through the first terminal device and for the real object; and a second receiving module, configured to receive an acquisition request sent by a second terminal device, where the acquisition request is used for indicating a case that the second terminal device acquires a second captured image for the real object; and a second sending module, configured to send the annotation information to the second terminal device, in response to the acquisition request.

According to one or more embodiments of the present disclosure, the first receiving module is specifically configured to: receive first indication information and the annotation information of the real object correspondingly sent by the first terminal device; where the acquisition request carries second indication information, and the second sending module is specifically configured to: if it is determined that the second indication information matches the first indication information, send the annotation information to the second terminal device. In an embodiment of the present disclosure, the first indication information includes an image of the real object extracted from the first captured image and location information of the first terminal device; the second indication information includes an image of the real object extracted from the second captured image and location information of the second terminal device; and the second sending module is specifically configured to: if it is determined that the location information of the second terminal device matches the location information of the first terminal device, and the image of the real object extracted from the second captured image matches the image of the real object extracted from the first captured image, send the annotation information to the second terminal device.

According to one or more embodiments of the present disclosure, the first indication information includes an image of the real object extracted from the first captured image and location information of the first terminal device; the acquisition request carries location information of the second terminal device, and the second sending module is specifically configured to: if it is determined that the location information of the second terminal device matches the location information of the first terminal device, send the prompt information to the second terminal device; where the prompt information is used to indicate that an area represented by the location information of the second terminal device includes the annotation information; the second receiving module is further configured to: receive an image of the real object extracted from the second captured image sent by the second terminal device; and the second sending module is further specifically configured to: if it is determined that the image of the real object extracted from the second captured image matches the image of the real object extracted from the first captured image, send the annotation information to the second terminal device.

According to one or more embodiments of the present disclosure, the first receiving module is further configured to receive the visiting user list sent by the first terminal device; and the second sending module is specifically configured to: if it is determined that the user identification corresponding to the second terminal device exists in the visiting user list, execute the step of sending the annotation information to the second terminal device.

In the sixth aspect, according to one or more embodiments of the present disclosure, a second terminal device is provided, including: a second acquisition module, configured to acquire a second captured image for a real object, and send an acquisition request to a server; where the server stores annotation information of the real object sent by a first terminal device, the annotation information is generated by the first terminal device, based on input information from a user input operation, in response to the user input operation for the real object in a first captured image, and the first captured image is acquired through the first terminal device and for the real object; a third receiving module, configured to receive the annotation information of the real object returned by the server; and an information display module, configured to display the annotation information, corresponding to the real object, on the second captured image.

According to one or more embodiments of the present disclosure, the server further stores first indication information of the real object sent by the first terminal device; the acquisition request carries second indication information; where the second indication information is specifically used to determine whether the second captured image acquired by the second terminal device matches the first indication information.

According to one or more embodiments of the present disclosure, the first indication information includes an image of the real object extracted from the first captured image and location information of the first terminal device; the second indication information includes an image of the real object extracted from the second captured image and location information of the second terminal device; in case that the location information of the second terminal device matches the location information of the first terminal device, and the image of the real object extracted from the second captured image matches the image of the real object extracted from the first captured image, the second captured image matches the first indication information.

According to one or more embodiments of the present disclosure, the first indication information includes an image of the real object extracted from the first captured image and location information of the first terminal device; the acquisition request carries location information of the second terminal device, and the third receiving module is further configured to: if it is determined that the location information of the second terminal device matches the location information of the first terminal device, receive prompt information sent by a server, where the prompt information is used to indicate that an area represented by the location information of the second terminal device includes the annotation information; send the image of the real object extracted from the second captured image to the server; if it is determined that the image of the real object extracted from the second captured image matches the image of the real object extracted from the first captured image, execute the step of receiving the annotation information of the real object returned by the server.

According to one or more embodiments of the present disclosure, the annotation information includes a classification label; and the information display module is specifically configured to display, according to the classification label, the annotation information on the real object of the second captured image by category.

In the seventh aspect, according to one or more embodiments of the present disclosure, an electronic device is provided, including: at least one processor and a memory; where the memory stores computer executable instructions; when the at least one processor executes the computer executable instructions stored in the memory, the at least one processor is enabled to execute the methods according to various possible designs of the first aspect and the first aspect, or to execute the methods according to various possible designs of the second aspect and the second aspect, or to execute the methods according to various possible designs of the third aspect and the third aspect.

Specifically, when the electronic device is a first terminal device, the first terminal device includes at least one processor and a memory; where the memory stores computer executable instructions which; when executed by the at least one processor, causes the at least one processor to execute the methods according to various possible designs of the first aspect and the first aspect.

When the electronic device is a server, the server includes at least one processor and a memory; where the memory stores computer executable instructions which; when executed by the at least one processor, causes the at least one processor to execute the methods according to various possible designs of the second aspect and the second aspect.

When the electronic device is a second terminal device, the second terminal device includes at least one processor and a memory; where the memory stores computer executable instructions which; when executed by the at least one processor, causes the at least one processor to execute the methods according to various possible designs of the third aspect and the third aspect.

In the eighth aspect, according to one or more embodiments of the present disclosure, a computer-readable storage medium is provided, where the computer-readable storage medium stores computer-executable instructions, when the computer-executable instructions are executed by a processor, the methods according to various possible designs of the first aspect and the first aspect are implemented, or the methods according to various possible designs of the second aspect and the second aspect are implemented, or the methods according to various possible designs of the third aspect and the third aspect are implemented.

Specifically, a computer-readable storage medium may be provided on the first terminal device side, to implement the methods according to various possible designs of the first aspect and the first aspect. Another computer-readable storage medium may be provided on the server side, to implement the methods according to various possible designs of the second aspect and the second aspect. Yet another computer-readable storage medium may be provided on the second terminal device side, to implement the method according to various possible designs of the third aspect and the third aspect.

In the ninth aspect, according to one or more embodiments of the present disclosure, a computer program product is provided, where the computer program product includes a computer program stored in a readable storage medium, from which one or more processors of an electronic device may read the computer program, and when the one or more processors execute the computer program, the electronic device is enabled to execute the methods according to various possible designs of the first aspect and the first aspect, or the methods according to various possible designs of the second aspect and the second aspect, or the methods according to various possible designs of the third aspect and the third aspect.

In the tenth aspect, according to one or more embodiments of the present disclosure, a computer program stored in a readable storage medium is provided, one or more processors of an electronic device may read the computer program from the readable storage medium, and when the one or more processors execute the computer program, the electronic device is enabled to execute the methods according to various possible designs of the first aspect and the first aspect, or the methods according to various possible designs of the second aspect and the second aspect, or the method according to various possible designs of the third aspect and the third aspect.

The above description is merely the preferred embodiment of the present disclosure and an illustration of the technical principles used. Those skilled in the art should understand that the disclosure scope involved in the present disclosure is not limited to the technical solutions formed by the specific combination of the above technical features; at the same time, it should also cover, without departing from the above disclosed concept, other technical solutions formed by any combination of the above technical features or their equivalents, for example, the technical solution that is formed by replacing the above features with the technical features (but not limited to) having similar functions that are disclosed in the present disclosure.

In addition, although operations are illustrated in a particular order, this should not be understood, however, as requiring the operations to be performed in the particular order shown or in a sequential order. Under certain circumstances, multitasking and parallel processing may be beneficial. Likewise, although the above discussion contains several specific implementation details, these should not be construed as limitations on the scope of the present disclosure. Some features described in the context of separate embodiments may also be implemented in combination in a single embodiment. Conversely, the features described in the context of a single embodiment may also be implemented in multiple embodiments separately or in any appropriate sub-combination.

Although the subject has been described in a language specific to structural features and/or logical actions of the method, it should be understood, however, that the subject defined in the appended claims is not necessarily limited to the specific features or actions described above. On the contrary, the specific features and actions described above are merely example forms for implementing the claims.

What is claimed is:

1. An information interaction method, wherein the method is applied to a first terminal device, and the method comprises:

acquiring a first captured image for a real object and displaying the first captured image;

in response to a user input operation for the real object in the first captured image, generating, based on input information from the user input operation, augmented reality (AR) annotation information of the real object; and sending the AR annotation information of the real object and location information of the first terminal device to a server, wherein the AR annotation information, in case that a second terminal device acquires a second captured image for the real object, is sent by the server to the second terminal device and is displayed, corresponding to the real object, by the second terminal device on the second captured image, the AR annotation information is AR annotation information corresponding to the second captured image of the real object selected from AR annotation information corresponding to location information of the second terminal device when it is determined that an image of the real object extracted from the second captured image matches the image of the real object extracted from the first captured image, and the AR annotation information corresponding to the location information of the second terminal device is selected from pre-stored AR annotation information when it is determined that the location information of the second terminal device matches the location information of the first terminal device, and prompt information, in case that the server actively detects to obtain the location information of the second terminal device and determines that the location information of the second terminal device matches the location information of the first terminal device, is sent by the server to the second terminal device, and the prompt information is sent before the AR annotation information is sent and is used to indicate that an area represented by the location information of the second terminal device comprises the AR annotation information, and the method further comprises sending a blacklist to the server, wherein the blacklist comprises a user identification that is not allowed to access the AR annotation information of the real object.

2. The method according to claim 1, wherein the sending the AR annotation information of the real object to the server comprises:

sending first indication information and the AR annotation information of the real object to the server correspondingly, wherein the AR annotation information, in case that the second terminal device determines that the second captured image matches the first indication information, is sent by the server to the second terminal device, and is displayed, corresponding to the real object, by the second terminal device on the second captured image.

3. The method according to claim 2, wherein the first indication information comprises an image of the real object extracted from the first captured image and the location information of the first terminal device, and in case that the location information of the second terminal device matches the location information of the first terminal device and the second captured image matches the image of the real object, the second captured image matches the first indication information.

4. The method according to claim 1, wherein the AR annotation information comprises a classification label, and the classification label is used for classification display in case of displaying the AR annotation information by the second terminal device.

5. The method according to claim 1, wherein in response to the user input operation for the real object in the first captured image, generating, based on the input information from the user input operation, the AR annotation information of the real object comprises:

acquiring a two-dimensional plane of the real object in the first captured image; and in response to the user input operation for the two-dimensional plane, generating, based on the input information from the user input operation, the AR annotation information of the real object.

6. The method according to claim 1, wherein the method further comprises:

receiving reply information for the AR annotation information sent by the second terminal device, and displaying the reply information.

7. A first terminal device, comprising:

at least one processor; and a memory storing instructions and connected with the at least one processor, wherein the instructions, when executed by the at least one processor, cause the at least one processor to implement the method according to claim 1.

8. A non-transitory computer-readable storage medium, wherein the non-transitory computer-readable storage medium has stored computer-executable instructions, and when the computer-executable instructions are executed by a processor, the method according to claim 1 is implemented.

9. An information interaction method, wherein the method is applied to a server, and the method comprises:

receiving augmented reality (AR) annotation information of a real object sent by a first terminal device; wherein the AR annotation information, in response to a user input operation for the real object in a first captured image, is generated by the first terminal device based on input information from the user input operation, and the first captured image is acquired through the first terminal device and for the real object;

receiving an acquisition request sent by a second terminal device, wherein the acquisition request is used for indicating a case that the second terminal device acquires a second captured image for the real object;

sending the AR annotation information to the second terminal device, in response to the acquisition request; and actively detecting to obtain location information of the second terminal device, wherein the sending the AR annotation information to the second terminal device, in response to the acquisition request, comprises:

when it is determined that the location information of the second terminal device matches location information of the first terminal device, sending prompt information to the second terminal device, wherein the prompt information is sent before the AR annotation information is sent and is used to indicate that an area represented by the location information of the second terminal device comprises the AR annotation information; and selecting AR annotation information corresponding to the location information of the second terminal device from pre-stored AR annotation information;

receiving an image of the real object extracted from the second captured image sent by the second terminal device;

when it is determined that the image of the real object extracted from the second captured image matches the image of the real object extracted from the first captured image, selecting AR annotation information corresponding to the second captured image for the real object from the AR annotation information corresponding to the location information of the second terminal device, and sending the AR annotation information corresponding to the second captured image of the real object to the second terminal device; and receiving a blacklist from the first terminal device, wherein the blacklist comprises a user identification that is not allowed to access the AR annotation information of the real object.

10. The method according to claim 9, wherein the receiving the AR annotation information of the real object sent by the first terminal device comprises:

receiving first indication information and the AR annotation information of the real object correspondingly sent by the first terminal device, and the acquisition request carries second indication information, and the sending the AR annotation information to the second terminal device, in response to the acquisition request, comprises:

if it is determined that the second indication information matches the first indication information, sending the AR annotation information to the second terminal device.

11. The method according to claim 10, wherein the first indication information comprises an image of the real object extracted from the first captured image and the location information of the first terminal device, and the second indication information comprises an image of the real object extracted from the second captured image and the location information of the second terminal device.

12. A server, comprising:

at least one processor; and a memory storing instructions and connected with the at least one processor, wherein the instructions, when executed by the at least one processor, cause the at least one processor to implement the method according to claim 9.

13. A non-transitory computer-readable storage medium, wherein the non-transitory computer-readable storage medium has stored computer-executable instructions, and when the computer-executable instructions are executed by a processor, the method according to claim 9 is implemented.

14. An information interaction method, wherein the method is applied to a second terminal device not included in a blacklist, and the method comprises:

acquiring a second captured image for a real object, and sending an acquisition request to a server; wherein the server stores augmented reality (AR) annotation information of the real object sent by a first terminal device, the AR annotation information is generated by the first terminal device, based on input information from a user input operation, in response to the user input operation for the real object in a first captured image, and the first captured image is acquired through the first terminal device and for the real object, wherein the blacklist is sent by the first terminal device to the server, and the blacklist comprises a user identification that is not allowed to access the AR annotation information of the real object;

receiving the AR annotation information of the real object returned by the server, wherein the AR annotation information is AR annotation information corresponding to the second captured image of the real object selected from AR annotation information corresponding to location information of the second terminal device when it is determined that an image of the real object extracted from the second captured image matches the image of the real object extracted from the first captured image, and the AR annotation information corresponding to the location information of the second terminal device is selected from pre-stored AR annotation information when it is determined that the location information of the second terminal device matches location information of the first terminal device; and displaying the AR annotation information, corresponding to the real object, on the second captured image, wherein the method further comprises:

receiving prompt information sent by the server, wherein the prompt information is sent when the server actively detects to obtain the location information of the second terminal device and when the server determines that the location information of the second terminal device matches the location information of the first terminal device, and the prompt information is sent before the AR annotation information is sent and is used to indicate that an area represented by the location information of the second terminal device comprises the AR annotation information;

sending an image of the real object extracted from the second captured image to the server; and if it is determined that the image of the real object extracted from the second captured image matches the image of the real object extracted from the first captured image, executing the step of receiving the AR annotation information of the real object returned by the server.

15. The method according to claim 14, wherein the server further stores first indication information of the real object sent by the first terminal device, the acquisition request carries second indication information, and the second indication information is used to determine whether the second captured image acquired by the second terminal device matches the first indication information.

16. The method according to claim 15, wherein the first indication information comprises an image of the real object extracted from the first captured image and the location information of the first terminal device, and the second indication information comprises an image of the real object extracted from the second captured image and the location information of the second terminal device.

17. The method according to claim 14, wherein the AR annotation information comprises a classification label, and the displaying the AR annotation information, corresponding to the real object, on the second captured image comprises:

displaying, according to the classification label, the AR annotation information on the real object of the second captured image by category.

18. A second terminal device, comprising:

at least one processor; and a memory storing instructions and connected with the at least one processor, wherein the instructions, when executed by the at least one processor, cause the at least one processor to implement the method according to claim 14.

19. A non-transitory computer-readable storage medium, wherein the non-transitory computer-readable storage medium has stored computer-executable instructions, and when the computer-executable instructions are executed by a processor, the method according to claim 14 is implemented.

* * * * *